R. KITSON.
Beater for Cotton Opener.

No. 229,615. Patented July 6, 1880.

UNITED STATES PATENT OFFICE.

RICHARD KITSON, OF LOWELL, MASSACHUSETTS.

BEATER FOR COTTON-OPENERS.

SPECIFICATION forming part of Letters Patent No. 229,615, dated July 6, 1880.

Application filed November 21, 1877.

*To all whom it may concern:*

Be it known that I, RICHARD KITSON, of Lowell, in the county of Middlesex and State of Massachusetts, have invented certain new and useful Improvements in Beaters for Cotton-Openers, of which the following is a description.

The object of my invention is to provide a beater for cotton-openers so constructed as to prevent its being clogged by the cotton collecting upon the several parts, especially the arms.

Owing to the draft caused by the rapid revolution of the beater the loose opened mass of cotton is drawn around with the beater within the partially-inclosed beater-box.

The blades of the beater will keep themselves free, on account of their rapid striking against the cotton, from the feed-rolls, and the cotton will not collect to any great extent around the shaft; but owing to the rotary motion of the cotton with the beater within the box the cotton rapidly collects around and in rear of the radial arms of the beater, and the mass thus collected clogs and impedes the revolution of the beater and necessitates the frequent stoppage of the machine for the purpose of clearing the beater-arms.

The nature of the invention will fully appear from the subjoined description and claims when considered with reference to the accompanying drawings, forming part of this specification.

Figure 1:
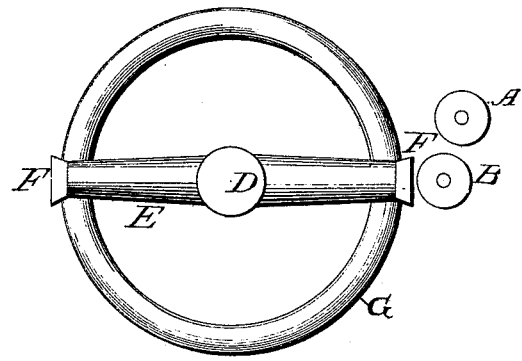
Figure 2:
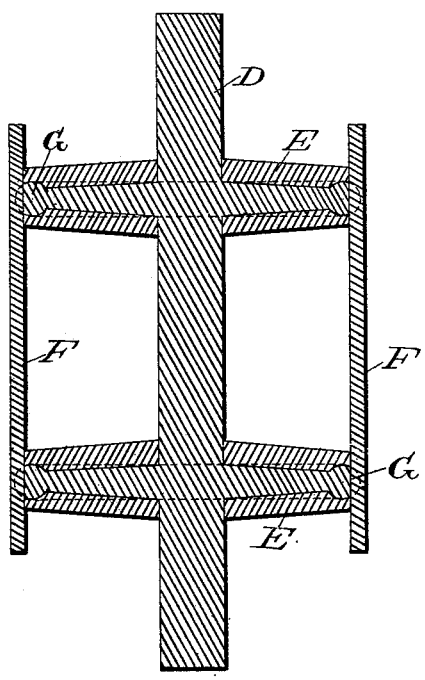

In the drawings, Figure 1 represents an end view of my improved beater, and Fig. 2 a horizontal section.

A B represent the feed-rolls of the machine, D the shaft of the beater, and F F the blades. To the shaft D, I attach a disk, G, which I prefer to make of a circular form, and of that kind of iron known as "boiler-plate;" and in order to have a sufficiently firm and broad base to attach the beater-blades F F to, I rivet or otherwise attach to these disks where the blades are attached thereto abutments E E, which, as shown, are of the form of radial arms on each side, within and without, of the disk, and closely connected thereto with rounded edges; but it is evident that this abutment may be formed in any other convenient manner, so as to form a firm and solid support to the blade.

This method of construction forms a beater which cannot become clogged, and in which there is no liability of the parts working loose, and which, on account of its light and balanced form, may be driven at a high rate of speed with perfect safety, and with less power than a closed beater, and when one face of the blade becomes worn the beater may be turned and the other side used.

It will be seen that on account of the contiguity of the feed-rolls A B and the periphery of the disks G G the mass of cotton constantly progressing through the feed-rolls against the beater serves to constantly sweep or brush the blades and disks of the beater free from all masses of cotton that would otherwise clog or commence to clog the beater; and this is important, as, if the clogging can be prevented from commencing by slow degrees, it will never occur in sufficient quantity to interfere with the operation of the beater. This is also facilitated by a bead or rounded edge thicker than the body of the disk, surrounding its outer edge, to which there is less tendency of the cotton to adhere.

In operation the interior currents of air sweep outwardly from the center of the beater and along the faces of the disks, and therefore they wipe around the sides of the curved edges thereof and contribute to dislodge such fiber as may be adhering thereto.

I claim as new and of my invention—

1. The combination of the feed-rolls A B and the beater consisting of the disks G, fixed blades F, and shaft D, substantially as described.

2. The combination, with the beaters, of a disk or disks, G, provided with a thickened rounded or beaded edge, substantially as and for the purpose described.

3. The combination, with the beaters, of the disks G, provided with radial abutments E E, whose cross-section is the segment of a circle, substantially as described.

RICHARD KITSON.

Witnesses:
S. KITSON,
A. K. GARLAND.